US009323019B1

(12) United States Patent
Goddard et al.

(10) Patent No.: US 9,323,019 B1
(45) Date of Patent: Apr. 26, 2016

(54) LONG SPAN ALL DIELECTRIC SELF-SUPPORTING (ADSS) FIBER OPTIC CABLE

(71) Applicant: OFS Fitel, LLC, Norcross, GA (US)

(72) Inventors: Timothy Goddard, Newnan, GA (US); Peter A Weimann, Atlanta, GA (US); Jack Ledbetter, Carrollton, GA (US); Richard Norris, Powder Springs, GA (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 14/554,710

(22) Filed: Nov. 26, 2014

(51) Int. Cl.
*G02B 6/44* (2006.01)
*G02B 6/48* (2006.01)

(52) U.S. Cl.
CPC ............ *G02B 6/4427* (2013.01); *G02B 6/4433* (2013.01); *G02B 6/4434* (2013.01); *G02B 6/4494* (2013.01); *G02B 6/483* (2013.01)

(58) Field of Classification Search
CPC .. G02B 6/4427; G02B 6/4433; G02B 6/4434; G02B 6/4494
USPC ......................................................... 385/110
See application file for complete search history.

(56) References Cited

U.S. PATENT DOCUMENTS

| | | | | | |
|---|---|---|---|---|---|
| 4,909,592 | A * | 3/1990 | Arroyo | ................ | G02B 6/4433 174/23 C |
| 5,630,003 | A | 5/1997 | Arroyo | | |
| 6,088,499 | A * | 7/2000 | Newton | ............... | G02B 6/4495 385/106 |
| 6,304,701 | B1 * | 10/2001 | Bringuier | ............. | G02B 6/4494 385/100 |
| 6,400,873 | B1 * | 6/2002 | Gimblet | ............... | G02B 6/4433 385/100 |
| 6,421,486 | B1 * | 7/2002 | Daneshvar | ........... | G02B 6/4482 385/109 |
| 7,099,542 | B2 | 8/2006 | Ledbetter et al. | | |
| 7,242,831 | B2 * | 7/2007 | Fee | ........................ | G02B 6/441 385/102 |
| 7,336,873 | B2 * | 2/2008 | Lail | ...................... | G02B 6/4429 385/100 |
| 8,412,012 | B2 | 4/2013 | Jost et al. | | |
| 2007/0263964 | A1 * | 11/2007 | Cody | ................... | G02B 6/4472 385/100 |
| 2009/0087154 | A1 | 4/2009 | Bradley et al. | | |

OTHER PUBLICATIONS

OFS Fitel, LLC, PowerGuide ShortSpan DT Cable (brochure, 4 pages).

* cited by examiner

*Primary Examiner* — Sung Pak
(74) *Attorney, Agent, or Firm* — Law Office of Leo Zucker

(57) ABSTRACT

A long span ADSS fiber optic cable has an outer jacket, a central tension rod member, and gel-free buffer tubes stranded around the rod member. Each tube is made of a flexible material having a determined elastic modulus, and optical fibers are contained in each tube with a water absorbent material. Water blocking yarns fill voids between the buffer tubes and surround the tubes. An inner jacket envelops the tubes and the yarns, and additional yarns are provided between the inner and the outer cable jackets. The elastic modulus of the buffer tubes is sufficiently high so that the cable sustains a compressive load of at least 220 N/cm over ten minutes with not more than a 0.1 dB increase in attenuation in any fiber. The rod member and the yarns enable the cable to span a distance of approximately 500 to 1050 feet in a NESC Heavy Load district.

16 Claims, 2 Drawing Sheets

LONG SPAN ALL DIELECTRIC SELF-SUPPORTING (ADSS) FIBER OPTIC CABLE

BACKGROUND OF THE INVENTION

1. Field of the Invention

The present invention relates to fiber optic cables, particularly all dielectric self-supporting (ADSS) fiber optic cables intended for installation over long spans.

2. Discussion of the Known Art

ADSS fiber optic cables are constructed to be self-supporting between poles, towers, or other fixed structures that support existing high voltage utility power lines. The cables contain optical fibers that are typically used for networked communication services. See, e.g., IEEE Standard 1222-2011, at page 7. The fibers may be routed loosely inside flexible buffer tubes contained within the cable (so called "loose tube" cables), or the fibers may be arranged in a ribbon configuration. The present invention relates to loose tube ADSS cables.

Once ADSS cables are installed and any co-located power lines are energized, the cables can be exposed to electric fields as high as 25 kV/meter or more. Thus, the cables must be made of only non-conductive or dielectric materials to avoid electrical arcing, heating, or other damage from the intense fields.

The National Electric Safety Code (NESC) provides mandatory load bearing requirements for overhead lines of all kinds, including power transmission lines, power distribution lines, and both wire and fiber optic telephone and cable TV lines including service drops to houses and commercial buildings. To account for the icing and wind loads that overhead lines must sustain throughout the year depending on their location, the NESC provides ice- and wind-load maps in which the United States is divided into three districts for ice loads: namely, Heavy, Medium, and Light districts.

In the Heavy ice-load district, encompassing states in the northeast and north central regions of the U.S., the uniform ice thickness is 0.5 in. In the Medium and Light districts toward the south, the uniform ice thicknesses are 0.25 in. and 0 in., respectively. The minimum wind load required for these districts is 4, 4, and 9 lb/ft$^2$, respectively. Also, a factor as high as 1.5 is applied to the basic ice loads for major transmission lines. Some northern utilities may develop even more stringent requirements if ice loads occur more frequently and to a higher degree than the NESC requirements anticipate for their location.

In addition to having to meet the applicable NESC ice and wind load requirements, when ADSS fiber optic cables are prepared for installation over long spans, (for example, between approximately 500 and 1050 feet in a NESC Heavy load district, between approximately 800 and 1650 feet in a Medium load district, and between approximately 1050 and 2200 feet in a Light load district), the cables are subjected to high compression or crushing forces as, they are rolled over sheaves, tensioners, or blocks. Clamps that are used to attach the cables permanently on the supporting structures also apply large crushing forces on the cables. To protect the fragile optical fibers inside the buffer tubes within the cables, the tubes must be able to resist deformation whenever large forces are applied to the cables both during and after installation. If such forces make the buffer tubes deform or flatten into a non-circular cross section, the environment of the fibers inside the tubes is physically altered and their ability to move freely whenever the cable is stressed becomes limited. Yet, buffer tube deformation continues to be a common failure mode for long span ADSS fiber optic cables, particularly during the installation phase.

In traditional ADSS cables, the buffer tubes are made of poly (butylene terephthalate) or PBT which has high crush resistance. Also, the tubes are often gel filled so that the combination of the high-modulus PBT buffer tubes with an incompressible gel filling prevents the tubes from deforming significantly during and after typical cable installations. Notwithstanding, the use of the gel filling presents two major problems, namely, cable weight and additional installation time.

First, PBT is a heavy engineering plastics material with a density of 1.3 gram/cc. The gel is also heavy and has a density in the range of 0.8 to 0.85 g/cc. Because of this, traditional ADSS cables require substantial internal reinforcement including expensive aramid yarns to act as dielectric strength members so that the cables are self-supporting over a rated span.

Second, providing a gel filling inside the buffer tubes is messy and costly. The gel is sticky and must be removed thoroughly before the optical fibers inside the tubes are exposed for splicing or termination in the field. It will therefore be understood that by eliminating the need for the gel filling, reducing the quantity of aramid yarn, and making the buffer tubes from a material that is lighter but harder than PBT, the cost of making a long span ADSS cable can be reduced and the cable installation made both simpler and safer.

FIG. 1 of the present application is a cross-sectional profile of a loose tube ADSS cable 10 sold by OFS Fitel, LLC, under the trademark PowerGuide® Short Span DT. The cable is intended for light duty, short span, non-custom applications. As seen in the drawing, the cable 10 includes:

A central strength or tension rod member 12 made of epoxy-fiberglass;

Buffer tubes 14 stranded about the central rod member 12 with a reverse oscillating lay (ROL) twist;

Optical fibers 16 routed inside the buffer tubes 14;

A water swellable yarn 18 or other water blocking material routed with the fibers inside each tube 14;

Dry water blocking materials 20 applied over the tubes 14;

Dielectric strength members 22; and

A medium-density polyethylene (MDPE) outer jacket 24.

For applications where the cable 10 is exposed to electric fields higher than about 12 kV/m, the outer jacket 24 can be made of a track resistant HDPE compound such as Borstar® HE6081 to prevent electrical arcing and tracking in the jacket. The jacket 22 may also contain a filler to make the surface of the jacket hard to wet by reducing surface energy, and to resist ablation of the jacket from electric charge.

Each buffer tube 14 is made of a polypropylene (PP) material having an elastic modulus greater than 1420, for example, Basell EBS 777D which has an elastic modulus of 2110 and is similar to that of PBT which is typically quoted at 2300-2600 MPa. The modulus of the buffer tubes 14 is also higher than that of typical commercial impact-modified PP materials which have a modulus of only about 1420 MPa and have been used to make buffer tubes for ADSS cables. See Table 1, below. Moreover, the density of PP is only about 0.92 g/cc, while PBT has a density of 1.3 g/cc.

The high modulus PP buffer tubes 14 allow the cable 10 to resist deformation from crushing loads at least to the same extent as traditional ADSS cables, and without the need for a gel filling which has a density typically in the range of 0.8-0.85 g/cc. Instead of using a gel to prevent water penetration in the cable 10, a light water swellable yarn 18 may be routed together with the fibers in each buffer tube 14. See, e.g., U.S. Pat. No. 7,099,542 (Aug. 29, 2006), and U.S. Pat. No. 5,630,003 (May 13, 1997), both of which are incorporated fully by reference. Instead of the yarn 18, a water blocking powder may be pre-coated on the fibers 16.

The lighter buffer tubes 14 and the absence of a gel in the tubes allows the weight per unit length of the cable 10 to be reduced compared to gel-filled cables. Thus, the quantity of aramid yarn and other expensive strength members usually needed to support the cable 10 over a given span are also reduced.

TABLE 1

Properties of PP Resins

|  | BP (Amoco) 3240 | Exxon-Mobil 7822NE7 | Borealis BB702W | Dow JQDA-2221 | Basell EBS 777D |
|---|---|---|---|---|---|
| Modulus, MPa | 1420 | 1420 | 1420 | 2120 | 2110 |
| Melt Flow Rate, g/10 min | 5.0 | 4.0 | 4.0 | 4.8 | 5.3 |

An early drawback of ADSS cables resided in the fact that because the cables are typically co-located with high voltage utility power lines, communications cables containing copper wire could not be lashed onto ADSS cables. Because the use of ADSS cables in distribution networks for Fiber-to-the-Home (FTTH) systems is increasing, there is no longer a great need to lash other cables over an installed ADSS cable. ADSS cables can now be used advantageously in leading-edge FTTH networks, with different cable configurations for trunk, feeder, and drop portions of the network. In addition, ADSS cable systems can be installed faster and more cost-effectively than similar lashed cable systems.

Notwithstanding the known art, there remains a need for a long span ADSS fiber optic cable capable of withstanding large crushing forces and stresses exerted on the cable during typical installation procedures, and after the cable is attached permanently to supporting structures that are spaced more than approximately 500 feet apart from one another in the NESC Heavy loading district.

SUMMARY OF THE INVENTION

According to the invention, an all dielectric self supporting (ADSS) fiber optic cable includes an outer jacket, a central tension rod member, and gel-free buffer tubes stranded about the tension rod member. Each buffer tube is made of a flexible material having a determined elastic modulus, and optical fibers are loosely contained in each tube together with a water absorbent material. A first set of water blocking yarns are arranged to fill voids between the buffer tubes and to surround the tubes, an inner cable jacket envelops the buffer tubes including the first set of water blocking yarns, and a second set of water blocking yarns are arranged between the inner and the outer cable jackets.

The elastic modulus of the buffer tube material is sufficiently high so that the cable sustains a compressive load of at least 220 N/cm over a 10 minute duration, and the maximum increase in attenuation for any single-mode fiber in the buffer tubes does not exceed 0.1 dB at 1550 nm during or after release of the compressive load.

Further, the tension rod member, the sets of water blocking yarns, and the cable jackets provide sufficient strength for the cable to span a distance between a pair of fixed support structures of approximately (i) 500 to 1050 feet in a defined NESC Heavy load district, (ii) 800 to 1650 feet in a NESC Medium load district, and (iii) 1050 to 2200 feet in a NESC Light load district.

For a better understanding of the invention, reference is made to the following description taken in conjunction with the accompanying drawing and the appended claims.

BRIEF DESCRIPTION OF THE DRAWING FIGURES

DETAILED DESCRIPTION OF THE INVENTION

Figure 1:
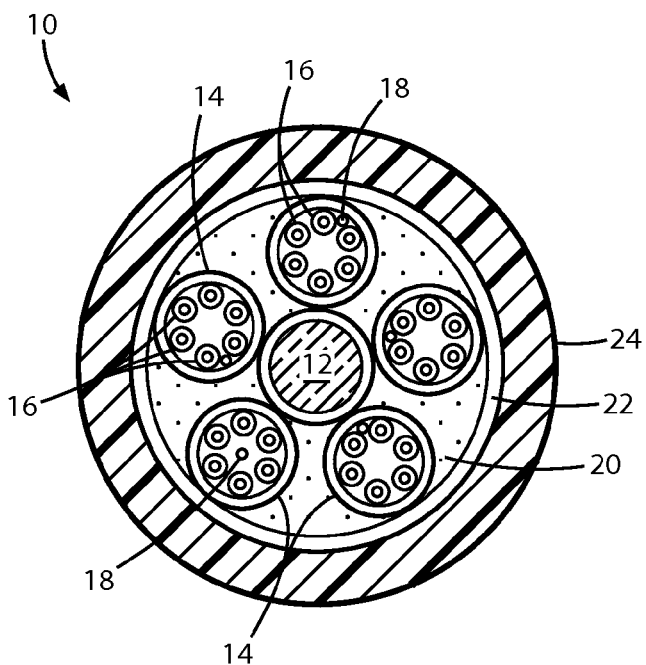
FIG. 1 is a cross sectional profile of an existing short span ADSS fiber optic cable.
Figure 2:
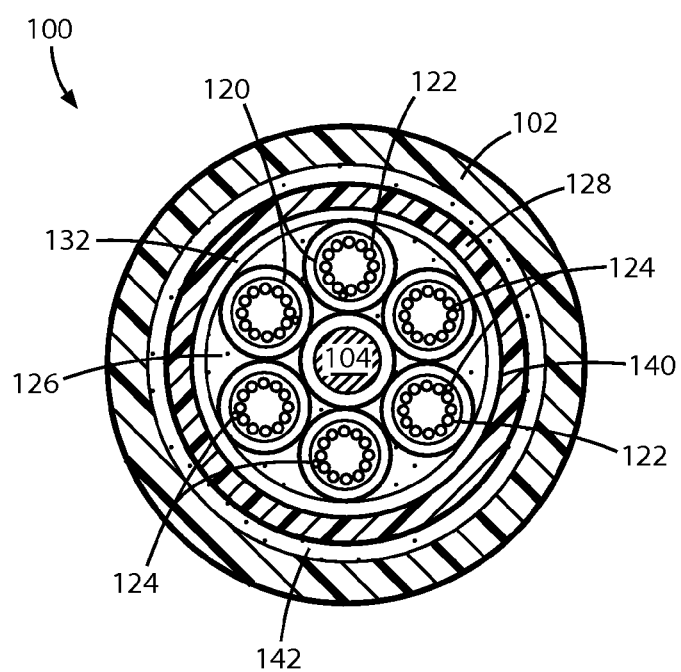
FIG. 2 is a cross sectional profile of a long span ADSS fiber optic cable according to the invention.
Figure 3:
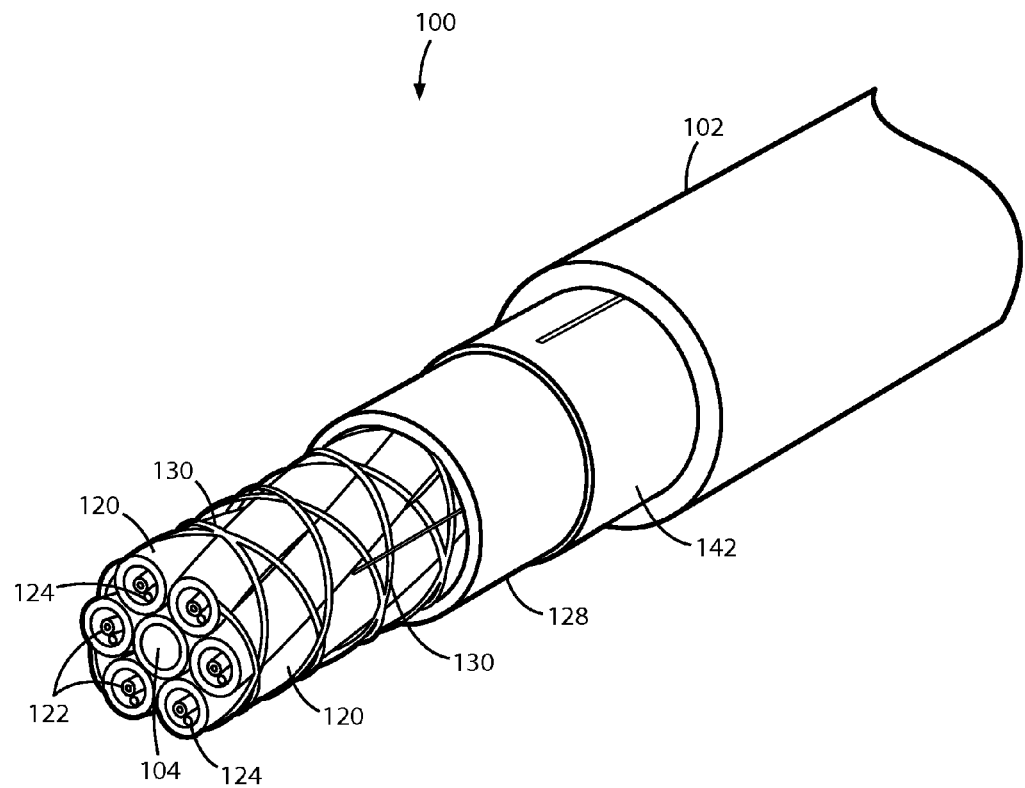
FIG. 3 is a perspective view of the inventive ADSS cable in FIG. 2.

FIG. 2 is a cross-sectional view, and FIG. 3 is a perspective view of one embodiment of an ADSS fiber optic cable 100 according to the invention. In the illustrated embodiment, the cable 100 has six buffer tubes containing a total of 72 fibers. The cable 100 includes an outer jacket 102 made, for example, of medium density polyethylene (MDPE), 1.4 mm thick. A central strength or tension rod member 104 extends over the cable axis A and may be formed, e.g., of a 2.29 mm diameter fiberglass/epoxy composite rod that is upjacketed with MDPE to an outer diameter (OD) of 3.35 mm.

A number of flexible, gel-free buffer tubes 120 are stranded symmetrically about the central tension rod member 104. In the embodiment of FIGS. 2 and 3, the cable 100 contains six buffer tubes 120 arranged in a single circular array about the rod member 104. For high fiber count cables requiring more than six buffer tubes 120, the tubes may be arranged in two concentric circular arrays about the rod member 104.

In the cable 100, each buffer tube 120 has an OD of 3.0 mm, and an inner diameter (ID) of 2.0 mm for loose passage of twelve optical fibers 122. Rather than use a gel filling compound to prevent infiltration of water, each buffer tube 120 may contain a length of a relatively light, commercially available low denier water swellable yarn 124 that is routed with the fibers 122 inside the tube over the length of the cable 100. Alternatively, the optical fibers 122 may themselves be pre-coated or dusted with a commercially available water blocking powder.

Since each optical fiber 122 has a nominal mass of about 64 g/km and an effective density of about 1.3 $g/cm^3$, the weight per unit length of the cable 100 is significantly less than that of an equivalent gel-filled ADSS cable. For example, the weight of a gel-filled 72-fiber ADSS cable is typically about 143.979 kg/km or 96.75 lb/kft. By contrast, the weight of the gel-free 72-fiber ADSS cable 100 in FIGS. 2 and 3 is only about 121.002 kg/km or 81.31 lb/kft representing a weight reduction of 16 percent.

A first set of aramid yarns 126 of a dry, commercially available water blocking material are disposed between the buffer tubes 120 over the length of the cable 100, in such a manner as to fill voids or interstices between the central rod member 104 and the inner circumference of a cable inner jacket 128. The buffer tubes 120 are bound together with the yarns 126 about the central rod member 104, by way of water absorbent binder threads 130.

A water blocking thread 132 is also wound helically about the bound buffer tubes 120, and a like water blocking thread 134 is applied on the bound buffer tubes 120 longitudinally over the length of the cable 100. The bound buffer tubes 120 are enveloped with the water blocking threads 132, 134, by the inner jacket 128 which is made from, e.g., MDPE with a thickness of 0.7 mm. A ripcord 140 is embedded in the wall of the inner jacket 128 longitudinally over the length of the cable 100.

A second set of aramid yarns 142 are applied over the outside surface of the inner jacket 138, followed by an application of wrapping tape. The 1.4 mm thick MDPE cable outer jacket 102 is then applied over the tape to complete the cable 100.

As detailed above, the weight per unit length of the long span cable 100 is reduced significantly with respect to traditional gel-filled ADSS cables, by replacing PBT with PP as a buffer tube material for greater crush resistance, and by eliminating the weight of the gel. Because of the reduced weight, the amount of expensive aramid yarn needed to support the cable 100 over long spans of approximately 500 or more feet in a NESC Heavy loading district is also reduced, saving costs. As a result, the lighter cable 100 is easier to handle and install, and will span greater distances than comparable gel-filled cables. Moreover, all else being equal, the cable 100 applies less tension on its support structures. In certain circumstances, the cable 100 will allow the use of relatively inexpensive dead end hardware which is easier to install and leads to more savings opportunities.

Eliminating the gel filling also reduces the time needed to splice the cable fibers 122 as much as 80% compared to ADSS cables with gel-filled buffer tubes. Faster splicing allows quicker restorations when supporting poles or towers are damaged and the cable 100 is compromised. Without the gel, no cleaning materials are needed before splicing the cable fibers in the field, thereby helping to reduce costs and potential irritants. Further, the need for deep cleaning of splicing machines and cleavers is less frequent, amounting to savings of thousands of dollars over short periods of time. And cleaner splicing machines means faster splicing with higher yields, especially for installers who use sensitive fixed V-groove splicers.

Installation simulations were conducted for the cable 100, in parallel with simulation testing of traditional ADSS cables with PBT/gel-filled buffer tubes. The simulations confirmed that the cable 100 will survive typical installation and clamping procedures without causing the buffer tubes 120 to deform. The long-term optical reliability of the cable 100 during actual service in the field is thereby assured.

The 72-fiber cable 100 was constructed, tested, and passed section 6.5.2.2 of IEEE Std 1222-2011 (a/k/a "the crush test"). The test procedure, which is the same for both gel-filled and gel-free ADSS cables, requires the cable 100 to sustain a compressive load of at least 220 N/cm over a duration of 10 minutes, with a maximum increase in the attenuation of any single-mode fiber in the buffer tubes 120 not to exceed 0.1 dB at 1550 nm, both during or after release of the load.

In addition, the cable 100 was tested and passed section 6.5.2.1 of IEEE Standard 1222-2011 (a/k/a "the sheave test") for the ability of the cable to withstand other stresses and strains normally encountered during installation. In this test, which is also the same for both gel-filled and gel-free ADSS cables, a section of the cable 100 was pulled up to its maximum stringing tension. The cable section was then pulled back and forth sixty times in each direction, for a total of 120 pulls.

Moreover, the central tension rod member, the sets of water blocking yarns, and the dual jacket configuration provide the cable 100 with enough strength to enable it to span a distance between a pair of fixed support structures of approximately (i) 500 to 1050 feet in a defined NESC heavy load district, (ii) 800 to 1650 feet in a defined NESC Medium load district, and (iii) 1050 to 2200 feet in a defined NESC Light load district.

While the foregoing represents preferred embodiments of the present invention, it will be understood by persons skilled in the art that various changes, modifications, and additions can be made without departing from the spirit and scope of the invention, and that the invention includes all such changes, modifications, and additions as are within the bounds of the following claims.

We claim:

1. A long span dielectric self supporting (ADSS) fiber optic cable, comprising:
   an outer jacket;
   a central tension rod member;
   buffer tubes stranded about the tension rod member, wherein each tube is made of a flexible material having a determined elastic modulus;
   optical fibers routed with a water absorbent material through each buffer tube;
   a first set of first water blocking yarns arranged to fill voids between the buffer tubes and to surround the tubes;
   an inner jacket formed to envelop the buffer tubes including the first set of water blocking yarns; and
   a second set of water blocking yarns arranged between the inner and the outer jackets of the cable;
   wherein the elastic modulus of the buffer tube material is sufficiently high so that the cable sustains a compressive load of at least 220 N/cm over a duration of 10 minutes, and a maximum increase in attenuation for any single-mode fiber in the buffer tubes does not exceed 0.1 dB at 1550 nm during or after release of the compressive load; and
   the central tension rod member, the sets of water blocking yarns, and the inner and the outer jackets have sufficient strength to enable the cable to span a distance between a pair of fixed support structures of approximately (i) 500 to 1050 feet in a defined NESC heavy load district, (ii) 800 to 1650 feet in a defined NESC Medium load district, and (iii) 1050 to 2200 feet in a defined NESC Light load district.

2. An ADSS fiber optic cable according to claim 1, wherein the material forming the buffer tubes is polypropylene.

3. An ADSS fiber optic cable according to claim 2, wherein the polypropylene material has an elastic modulus of approximately 2110 MPa.

4. An ADSS fiber optic cable according to claim 1, wherein the outer jacket of the cable is made of medium density polyethylene (MDPE).

5. An ADSS fiber optic cable according to claim 4, wherein the outer jacket of the cable is 1.4 mm thick.

6. An ADSS fiber optic cable according to claim 1, wherein the central tension rod member is a fiberglass/epoxy composite rod.

7. An ADSS fiber optic cable according to claim 6, wherein the outer diameter (OD) of the composite rod is about 2.29 mm, and the rod is upjacketed with MDPE to an OD of about 3.35 mm.

8. An ADSS fiber optic cable according to claim 1, including a thread arranged to bind the buffer tubes and the first set of water blocking yarns about the tension rod member.

9. An ADSS fiber optic cable according to claim 1, wherein each buffer tube has an inner diameter (ID) of about 2.0 mm, and an OD of about 3.0 mm.

10. An ADSS fiber optic cable according to claim 1, wherein the inner jacket of the cable is made of MDPE.

11. An ADSS fiber optic cable according to claim 10, wherein the inner jacket of the cable is about 0.7 mm thick.

12. An ADSS fiber optic cable according to claim 1, including six buffer tubes.

13. An ADSS fiber optic cable according to claim 12, wherein each of the buffer tubes contains 12 optical fibers.

14. An ADSS fiber optic cable according to claim 13, wherein the weight of the cable per unit length is approximately 121.002 kg/km or 81.31 lb/kft.

15. An ADSS fiber optic cable according to claim 1, wherein the buffer tubes are arranged in a single circular array around the tension rod member.

16. An ADSS fiber optic cable according to claim 1, wherein the buffer tubes are arranged in two concentric circular arrays around the tension rod member.

* * * * *